March 18, 1941.  A. Y. DODGE  2,235,673
TRANSMISSION
Filed Aug. 10, 1936   3 Sheets-Sheet 1
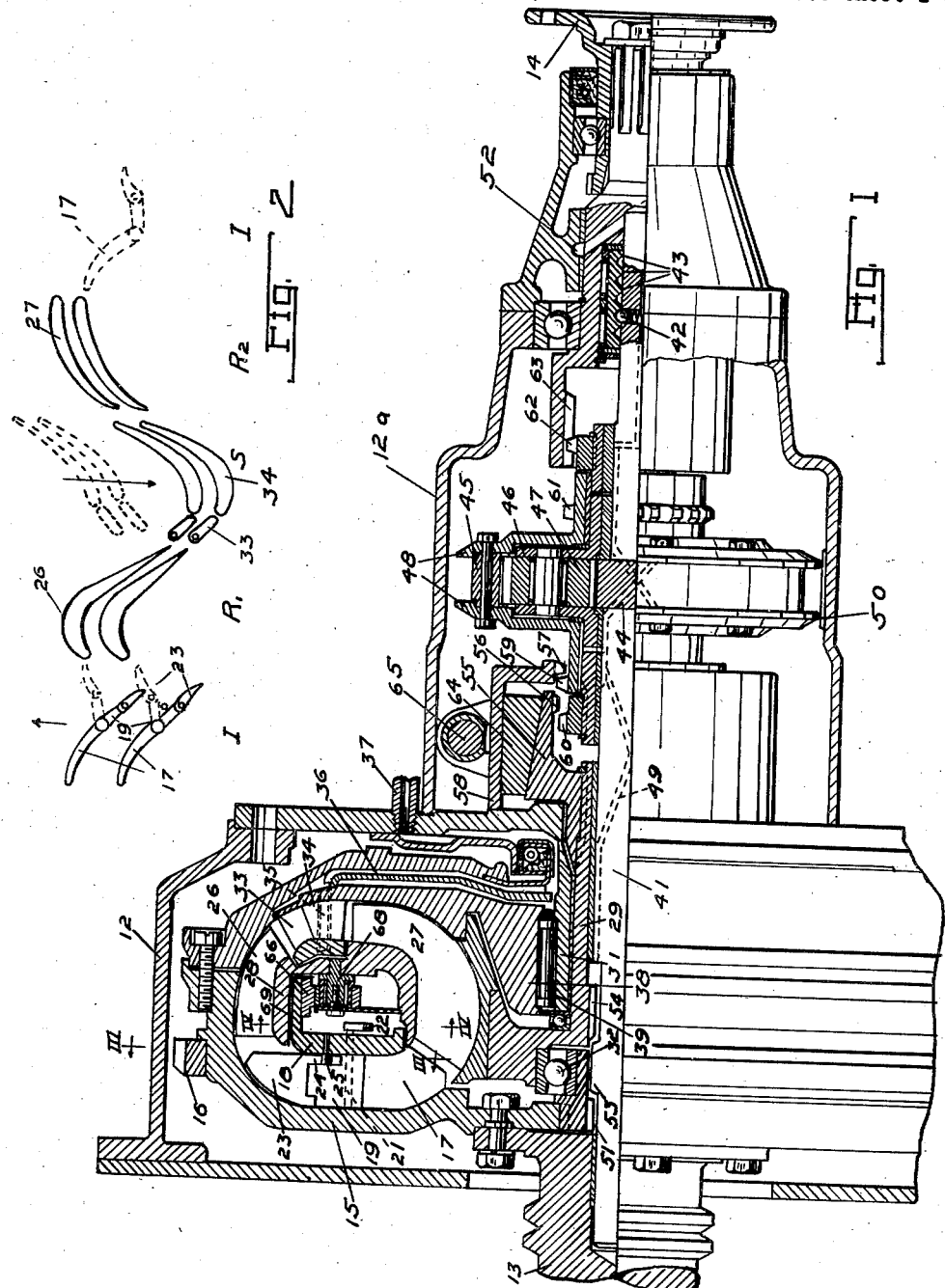
INVENTOR.
ADIEL Y. DODGE
BY
McConkey & Booth
ATTORNEYS.

March 18, 1941.　　　A. Y. DODGE　　　2,235,673
TRANSMISSION
Filed Aug. 10, 1936　　　3 Sheets-Sheet 2
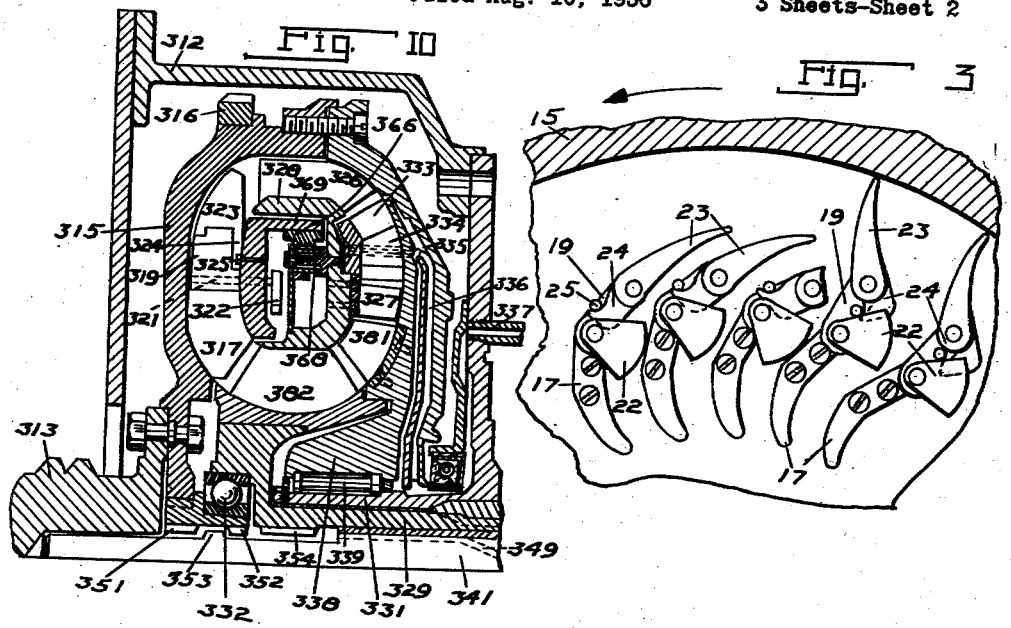
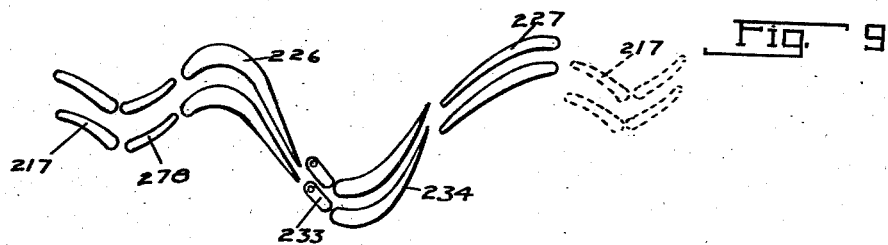
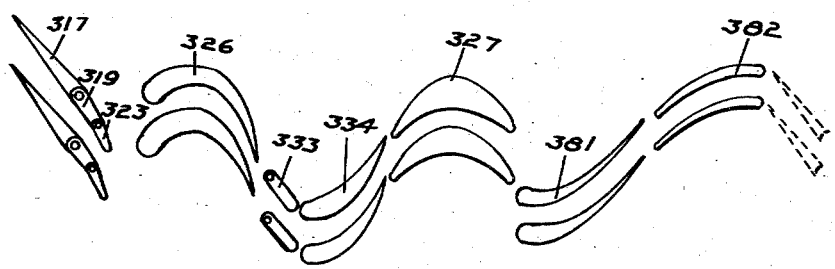
INVENTOR.
ADIEL Y. DODGE
BY
McConkey + Booth
ATTORNEYS.

March 18, 1941.　　A. Y. DODGE　　2,235,673
TRANSMISSION
Filed Aug. 10, 1936　　3 Sheets-Sheet 3
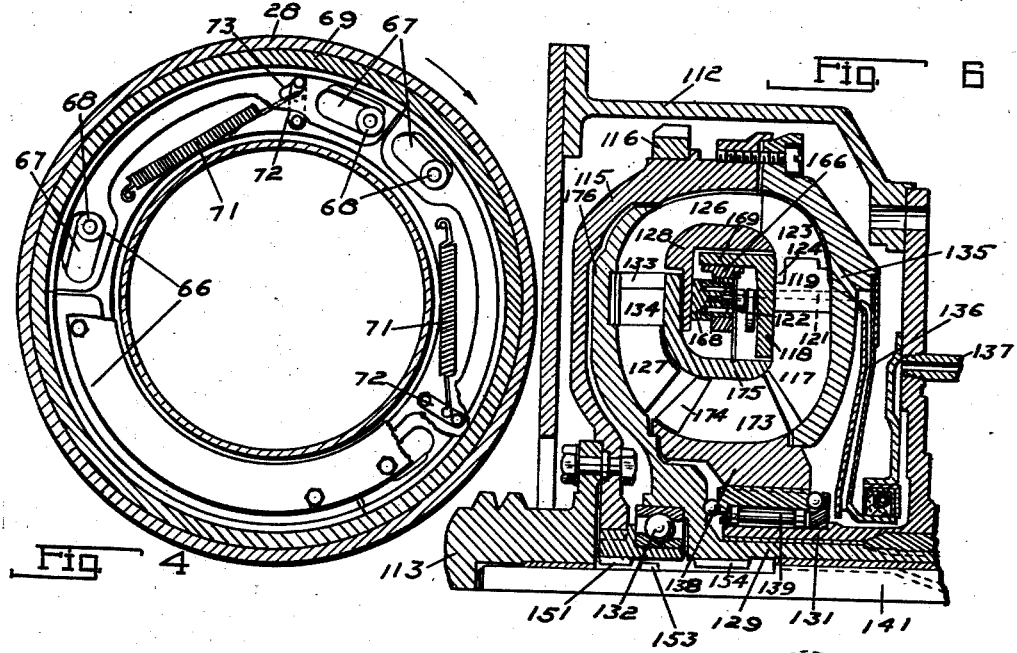
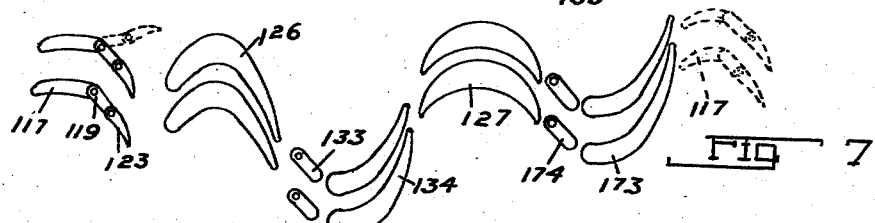
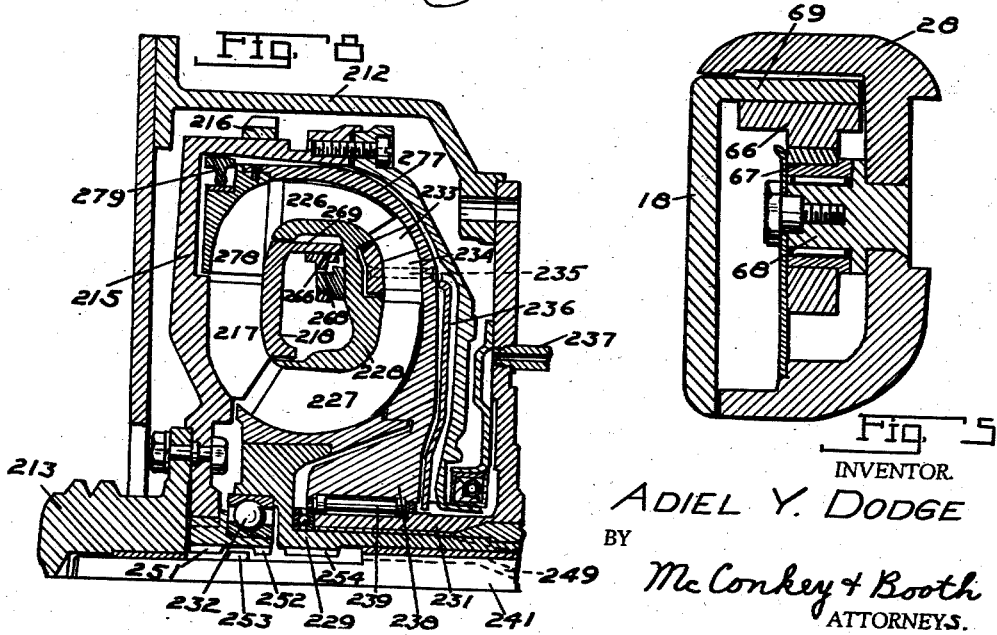
INVENTOR.
ADIEL Y. DODGE
BY
McConkey & Booth
ATTORNEYS.

Patented Mar. 18, 1941

2,235,673

UNITED STATES PATENT OFFICE 2,235,673

TRANSMISSION

Adiel Y. Dodge, South Bend, Ind.

Application August 10, 1936, Serial No. 95,117

6 Claims. (Cl. 192—3.2)

This invention relates to transmissions and more particularly to transmissions including a hydraulic unit to produce an infinite number of speed and torque variations.

In my copending application Serial No. 723,083 filed April 30, 1934, I have disclosed a transmission including a hydraulic torque converter and a differential gear set so arranged as to produce an "infinite" number of speed and torque ratios between a predetermined low and one-to-one. The present invention relates particularly to improvements in the hydraulic torque converter and in the arrangement thereof with a differential gear set to produce a higher torque ratio than is possible with the arrangement of said prior application and to provide for higher efficiency at high torque ratios.

According to the present invention the several elements forming the hydraulic circuit decrease in flow area from the impeller outlet back to the impeller inlet, thereby to provide an increasing flow velocity. Preferably the impeller is formed with a relatively large flow area so that the velocity therethrough is relatively low.

Another important feature of the invention relates to the arrangement of an impeller with a long radial length to develop a large centrifugal head and a pair of rotors, one of which has substantially no radial length and the other of which has a radial length substantially less than that of the rotor. Preferably a stator is mounted between the rotors. This arrangement results in a very low counter head and provides for a relatively high flow to produce efficient transmission.

The torque converter preferably provides for multi-stage torque multiplication, this being produced by providing a plurality of stators and a plurality of rotors arranged alternately in the circuit. I consider this arrangement to be a very important feature of the invention as it enables a very high degree of torque multiplication to be obtained with high efficiency.

The invention also provides a novel vaned impeller with two series of pivoted outlet vanes, one series being pivotally connected to the free ends of the other series. Preferably the series closest the inlet end of the impeller is connected to a plurality of centrifugal weights so that the vane position is controlled by a balance between liquid reaction in the power circuit and centrifugal force on the weights. The outlet series is preferably controlled by the first series, as by means of cams engaging fixed pins on the impeller.

Another feature of the invention relates to a novel speed responsive clutch for coupling the impeller to the rotor when the rotor is turning above a predetermined speed. Preferably the clutch parts are so arranged that the clutch is either substantially fully engaged or fully disengaged, thereby eliminating slipping or dragging.

Other objects, advantages, and novel features of the invention including novel arrangements of the torque converter with a gear set and desirable sub-combinations will be apparent from the following description when read in connection with the accompanying drawings, in which:

Figure 1 is a partial axial section with parts in elevation of a transmission embodying the invention;

Figure 2 is a developed diagrammatic view illustrating the vane arrangement in the transmission of Figure 1;

Figures 3 and 4 are partial sections on the lines III—III and IV—IV of Figure 1;

Figure 5 is an enlarged partial section similar to Figure 1;

Figures 6, 8 and 10 are partial sections of modified forms of torque converters; and Figures 7, 9, and 11 are developed diagrammatic views of the vane arrangements of the converters of Figures 6, 8 and 10 respectively.

The transmission of Figure 1 comprises a stationary casing 12 adapted to replace the usual variable speed transmission housing and having a driving shaft 13 projecting in one end thereof and a driven member 14 journaled in its other end. The member 14 is formed for connection with the usual propeller shaft of an automobile or with any other shaft which is to be driven.

The drive shaft is secured to a hydraulic torque converter casing 15 which forms the impeller of a torque converter and which preferably takes the place of the usual flywheel, being provided with gear teeth 16 for engagement by the usual engine starter. The casing 15 has rigidly secured thereto a series of fixed vanes 17 which carry at their inner edges a core member 18 and a series of vanes 19 are pivotally mounted at one end adjacent the outlet ends of the vanes 17. The vanes 19 are rigidly carried by pivots 21 which are journalled in the core 18 and casing 15 and which carry centrifugal weights 22. A second series of vanes 23 are pivoted to the free ends of vanes 19 and having inwardly extending cam projections 24 engaging pins 25 which are rigidly carried by the core 18.

As best seen in Figure 3, when the casing 15 is rotating in the direction of the arrow, liquid reaction tends to turn the vanes 19 and 23 back into the position shown at the left of the figure. With the vanes in this position liquid will leave the impeller with a high radial component and a relatively low circumferential component and this, together with the relatively short radial length of the impeller due to the angle of the vanes, produces a high torque multiplication. However, as the impeller speed increases the weights 22 will become effective to turn the vanes 19 into the position shown at the right of Figure 3 and the pins 25 acting on the cam portions 24 will simultaneously turn the vanes 23. In this position the liquid is given a large circumferential component tending to produce higher efficiency as the speed and torque ratios approach one to one.

Two series of rotor vanes 26 and 27 are mounted adjacent the outlet and inlet ends of the impeller respectively and are connected together by a core member 28 which, with the member 18, provides a hollow torroidal core. The vanes 27 are secured to a sleeve 29 which is journaled in an extension 31 on the casing 12 and which has a bearing 32 on an extension of the driving shaft 13. It will be noted that the vanes 26 extend across the upper part of the torroidal liquid circuit and have substantially no radial component and that the inlet end of the vanes 27 is substantially at the radial center of the torroidal circuit. This arrangement reduces the counter centrifugal head on the liquid in the circuit as pointed out above.

A stator is arranged between the rotor vanes 26 and 27 and includes a series of pivoted inlet vanes 33 and a series of fixed outlet vanes 34. The vanes 34 are drilled as indicated at 35 for inlet of liquid to the torque converter, the liquid being delivered by a centrifugal pump 36 which is supplied through a pipe 37 from any convenient source. The stator vanes are carried by a hub 38 which is mounted on a combined one-way clutch and bearing 39 on the extension 31 so that the stator is held against reverse rotation but is permitted to rotate forwardly.

An intermediate shaft 41 has its ends slidably journaled in the driving shaft 13 and the driven member 14. If desired a spring detent 42 may be carried by the shaft 41 for cooperation with a series of ridges 43 in the driven member to hold the shaft 41 yieldingly in any one of a plurality of axial positions.

The shaft 41 rigidly carries a gear 44 which serves as the sun gear of a differential planetary gear set including a ring gear 45 and a planet carrier 46 rotatably supporting a set of planet gears 47 in mesh with the sun and ring gears. The ring gear and the planet carrier are both rotatably sleeved on the shaft 41 and the ring gear sleeve is provided with spaced peripheral flanges 48 for engagement by a suitable shifting yoke, not shown. The entire gear unit is housed in an extension 12a of the casing 12 which is arranged to contain a body of liquid and which preferably has a connection 50 to a reservoir as shown more particularly in my copending application Serial No. 34,303 now matured into Patent No. 2,146,369.

The shaft 41 is drilled as at 49 and the bore 49 communicates with suitable oil grooves in the shaft to lubricate the ring gear and carrier sleeves. Liquid flowing through the bore 49 is collected in an annular groove 52 in the casing from which it is conducted back to the reservoir, passing first through a suitable cooler if desired. Liquid in the reservoir may be forced back into the torque converter through the pipe 37 due to the pressure developed by rotation of the gear unit or by a suitable pump of any desired type.

In order to provide various driving connections between the driving and driven shafts, the driving shaft 13 is formed with a set of teeth 51 adapted to engage teeth 53 formed on the shaft 41 and the rotor sleeve 29 is formed with a similar set of teeth 54 to engage the teeth 53. The sleeve 29 also carries at its end a conical block 55 formed with a set of teeth 56 and a similar set of teeth 57 are formed on a stationary extension 58 of the casing 12. The ring gear and planet carrier sleeves are formed at one end with sets of clutch teeth 59 and 60 respectively and at the opposite end with teeth 61 and 62 respectively. It will be noted that the teeth 56 and 60 are shortened so that they will not engage but that teeth 59 are full length to engage either teeth 56 or 57 and teeth 57 will also engage teeth 60. The teeth 61 and 62 are adapted to engage an elongated set of teeth 63 carried by an extension of the driven member.

To facilitate engagement of the various sets of teeth, a cone brake 64 is preferably splined in the housing 58 to engage the block 55. The brake 64 may be controlled by a pedal similar to the conventional clutch pedal through a shaft 65 and when engaged will slow down or stop rotation of the rotor to enable the clutch teeth to be engaged readily.

With the parts in the position shown in Figure 1 there is no connection between either the driving shaft or the rotor and the gear set and the transmission is in neutral. If the gear set is shifted to the left, teeth 51 and 53 will first engage and then teeth 56 and 59 will engage, teeth 62 and 63 being in engagement. In this position shaft 41 is connected to the driving shaft, the rotor is connected to the ring gear 45 and the gear carrier 46 is connected to the driven shaft. Thus the sun gear is turned forwardly by the driving shaft and the ring gear is turned forwardly at varying speed and torque ratios by the torque converter to drive the planet carrier and driven shaft jointly at ratios varying infinitely to one to one. This is the normal two-path automatic forward drive.

If the gear set is shifted to the right, teeth 53 will engage teeth 54 and teeth 59 will engage teeth 57, teeth 62 and 63 remaining in engagement. In this position the rotor turns the sun gear, and the ring gear is held stationary to provide an emergency low gear drive. Further shifting of the gear set to the right will pass through another neutral in which the ring gear is free, to a position with teeth 53 and 54, 60 and 57, and 61 and 63 respectively in engagement. In this position the rotor is connected to the shaft 41, the planet carrier is held stationary and the ring gear is connected to the driven shaft to produce reverse drive. It will be noted that in reverse the torque converter and gear set are connected in series to produce a speed ratio varying from zero to the ratio of the gear set as the torque converter approaches one-to-one drive.

It may be desirable at relatively high driven speeds to connect the driving and driven members of the torque converter mechanically and for this purpose there is provided according to the invention a novel speed-responsive clutch carried by the rotor and adapted to clutch the rotor to the impeller. The clutch as illustrated includes a plurality of arcuate friction shoes 66, shown as three, having cam slots 67 formed therein at their ends to receive pins 68 which are secured to the core member 28 and which preferably carry sleeves on suitable anti-friction bearings.

The impeller core member 18 is formed with an axial flange 69 surrounding the shoes 66 and the shoes are preferably formed on a smaller radius than the flange to insure engagement of the central portion thereof with the flange. The slots 67 are formed at an acute angle to a radius passing therethrough so that the pins act both as guides and as anchor pins for the friction shoes and are so arranged that when the shoes are moved relatively to the rotor in the direction of rotation of the impeller as indicated by the arrow in Figure 4 they will be cammed outwardly into engagement with the flange 69. In this way the shoes will initially move into engagement with the flange 69 in response to centrifugal force and will thereafter be self-actuated to connect the impeller and rotor, the relative effects of centrifugal force and self-actuation being controlled by the angle of the slots 67 as will be apparent.

The shoes 66 are urged out of engagement with the flange 69 and into the position shown in Figure 4 by springs 71 anchored at one end on the core member 28 and connected at the other end to the shoes. In order that the increasing extension of the springs as the shoes wear will not too greatly increase the spring tension and accordingly change too much the speed at which the shoes will engage, the springs are connected to levers 72 which are pivoted on the core member 28 and carry pins lying in arcuate slots 73 in the shoes. By this arrangement the springs urge the shoes out of engagement with a substantially constant force regardless of wear on the shoes and the action of the clutch will be the same at all times.

In operation, the shoes 66 are normally held in inoperative position by the springs 71 until the rotor reaches a predetermined speed, at which time they move outwardly in response to centrifugal force into engagement with the flange 69. Thereafter the combined effects of centrifugal force and self-actuation urge the shoes into tighter engagement with the flange 69 to clutch the rotor to the impeller. The clutch will remain in engagement until the rotor speed drops, it being noted that disengagement will not occur until the rotor is at a lower speed than that at which the clutch engages due to the self-actuation of the shoes. The difference between the speed of engagement and disengagement is controlled largely by the angle of the slots 67 but in any case disengagement can be caused to occur sooner by reversing the direction of torque, i. e., by slowing the driving member to a speed less than that of the driven member. It will be noted that the ends of the shoes are very closely spaced so that in operation they will engage each other and cause simultaneous engagement and disengagement of all of the shoes.

Figures 6 and 7 illustrate a modified form of torque converter adapted to be used in the transmission of Figure 1 and parts therein corresponding to like parts in Figures 1 to 5 have been designated by the same reference numbers plus 100. In this construction the liquid flow is in the opposite direction and liquid supplied by the pump 136 enters the impeller through a bore 135. The stator hub 138 carries a series of fixed vanes 173 and a series of pivoted inlet vanes 174 lying between the outlet of the second set of rotor vanes 127 and the inlet of the impeller vanes 117 and a core member 175 is secured to the vanes 173 and carries the stator vanes 133 and 134 which lie between the two sets of rotor vanes 126 and 127. Instead of being connected by the core member 128, the two sets of rotor vanes are carried by an extension 176 of the rotor sleeve 129.

With this arrangement the liquid circuit includes two rotors and two stators alternately so that liquid from the impeller passes through a first rotor, then through a stator, then through a second rotor and a second stator and returns to the impeller with a forward component to produce a two-stage drive. Preferably the flow area through the rotors and stators progressively decreases from the impeller outlet to the impeller inlet and increases in the impeller as in the first embodiment.

Figures 8 and 9 illustrate a further modified construction in which parts corresponding to like parts in Figures 1 to 5 have been designated by the same reference numbers plus 200. In this form the stator hub 238 is provided with an extension 277 which carries a set of vanes 278 lying between the outlet of the impeller vanes 217 and the inlet of the first set of rotor vanes 226. The stator also carries a speed responsive clutch 279 which may be of any desired type, as for example the type shown in detail in Figures 4 and 5, and which is engageable with the impeller casing 215 to clutch the stator to the impeller.

As best seen from the diagram in Figure 9, liquid will leave the impeller vanes with a high radial and low circumferential component and will be turned by the stator vanes 278 so that it leaves them and enters the rotor vanes 226 with a relatively high circumferential component. When the rotor is turning rapidly enough so that liquid leaves it with a forward rather than a reverse circumferential component, the liquid will strike the backs of stator vanes 233 and 234 and turn the stator forwardly on the one-way clutch 239. When the stator is turning at a predetermined speed the clutch 279 will move into engagement with the impeller casing 215, thereby clutching the stator to the impeller to turn therewith so that the stator vanes 278 become supplemental impeller vanes. At this time the unit operates as a multi-stage hydraulic clutch, transmitting torque at high efficiency at substantially a one-to-one ratio.

Figures 10 and 11 show a still further modified form of the invention in which parts corresponding to like parts in Figures 1 to 5 are designated by the same reference numbers plus 300. In this form the second set of rotor vanes 327 is shortened and a second set of stator vanes 381 is arranged adjacent the outlet of vanes 327. A third set of rotor vanes 382 is carried by the rotor hub 329 between the outlet of the stator vanes 381 and the inlet of the impeller vanes 317. Thus the modification of Figures 10 and 11 provides a three-stage torque converter including six elements, i. e. an impeller, three rotors and two stators, and I have found that this arrangement is desirable for heavy duty as in heavy trucks, rail cars and the like. As in the preceding embodiments, the flow areas through the rotors and stators progressively decrease to provide increasing velocity in the circuit from the impeller outlet to the impeller inlet.

While several embodiments of the invention have been shown and described in detail, it will be apparent that many changes might be made therein or that other forms might be devised. Accordingly, it is not intended that the scope of the invention shall be limited to the forms shown or otherwise than by the terms of the appended claims.

What is claimed is:

1. In a hydraulic torque converter having vaned impeller and rotor elements forming a fluid circuit, a series of vanes pivoted adjacent their inlet ends on the impeller, a second series of vanes pivoted to the free ends of the first-named series, means for controlling the position of the first-named series of vanes about their pivots, and means controlled by the position of the first-named vanes for controlling the position of the second series of vanes.

2. In a hydraulic torque converter having vaned impeller and rotor elements forming a fluid circuit, a series of vanes pivoted adjacent their inlet ends on the impeller, a second series of vanes pivoted to the free ends of the first-named series, means for controlling the position of the first-named series of vanes about their pivots, a series of pins fixedly carried by the impeller, and cam projections on the second series of vanes engaging said pins to adjust the position of the second series of vanes in accordance with the position of the first-named series of vanes.

3. In a hydraulic torque converter having vaned impeller and rotor elements forming a fluid circuit, a series of vanes pivoted adjacent their inlet ends on the impeller, a second series of vanes pivoted to the free ends of the first-named series, fluid acting on said pivoted vanes urging them in one direction about their pivots, a series of centrifugal weights secured to the first-named series of vanes to urge them in the other direction about their pivots, a series of pins fixedly carried by the impeller, and cam projections carried by the second series of vanes and engaging said pins whereby the second series of vanes will be moved in the other direction about their pivots as the first series of vanes move in response to said centrifugal weights.

4. A hydraulic torque converter comprising a vaned rotor, a vaned impeller and a vaned stator forming a fluid circuit, said impeller having two interconnected series of pivoted vanes adjacent its outlet end, means for controlling the position of one of said series of vanes in response to operating conditions, means operated by said one series of vanes for controlling the position of the other series, and a clutch responsive to the speed of the rotor for connecting the rotor and the impeller.

5. In a hydraulic torque converter having a rotatable impeller forming a part of a fluid circuit, a series of vanes pivoted on the impeller, a second series of vanes pivoted on said first named vanes, means to control the pivotal position of said first named vanes, and interengaging means on the second series of vanes and the impeller to control the position of the second series of vanes.

6. In a hydraulic torque converter having a rotatable impeller forming a part of a fluid circuit, a series of vanes pivoted on the impeller, a second series of vanes pivoted on said first named vanes, centrifugal means responsive to the speed of the impeller to control the position of the first named vanes, and means controlled by the position of the first named set of vanes to control the position of the second set of vanes.

ADIEL Y. DODGE.